(12) United States Patent
Cerra et al.

(10) Patent No.: US 8,356,468 B2
(45) Date of Patent: Jan. 22, 2013

(54) GAS TURBINE ENGINE NOZZLE CONFIGURATIONS

(75) Inventors: David F. Cerra, Bellevue, WA (US); Lie-Mine Gea, Irvine, CA (US); Robert H. Willie, Bothell, WA (US); Leonard J. Herbert, Kirkland, WA (US); Donald E. Robinson, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 678 days.

(21) Appl. No.: 12/483,424

(22) Filed: Jun. 12, 2009

(65) Prior Publication Data

US 2010/0313545 A1    Dec. 16, 2010

(51) Int. Cl.
*F02K 1/48* (2006.01)
*B64G 1/40* (2006.01)
*F02K 1/38* (2006.01)

(52) U.S. Cl. .......... 60/262; 60/264; 60/770; 239/265.19
(58) Field of Classification Search .................... 60/262, 60/264, 226.1, 770, 204; 239/265.19; 244/53 B; 181/213, 220
See application file for complete search history.

(56) References Cited

U.S. PATENT DOCUMENTS

| 6,360,528 B1 * | 3/2002 | Brausch et al. ................. 60/262 |
| 7,305,817 B2 | 12/2007 | Blodgett et al. |
| 2004/0244357 A1 | 12/2004 | Sloan |
| 2004/0262447 A1 | 12/2004 | Graziosi et al. |
| 2005/0172611 A1 | 8/2005 | James Blodgett et al. |
| 2007/0033922 A1 * | 2/2007 | Reba et al. ....................... 60/262 |
| 2008/0272228 A1 | 11/2008 | Mengle et al. |
| 2008/0272232 A1 | 11/2008 | Cagle et al. |
| 2009/0019857 A1 | 1/2009 | Tisdale et al. |
| 2009/0071164 A1 * | 3/2009 | Renggli ......................... 60/770 |

FOREIGN PATENT DOCUMENTS

| EP | 1703114 A1 | 9/2006 |
| EP | 1752649 A2 | 2/2007 |
| EP | 1995041 A2 | 11/2008 |

OTHER PUBLICATIONS

PCT International Search Report performed by the EPO, May 7, 2010.

* cited by examiner

*Primary Examiner* — Ted Kim
(74) *Attorney, Agent, or Firm* — Caven & Aghevli LLC

(57) ABSTRACT

In one embodiment, a gas turbine engine exhaust nozzle comprises a housing having a length which extends along a central longitudinal axis and comprising an interior surface and an exterior surface, and a row of chevrons extending from an aft end of the housing, the chevrons having a root region and a tip, wherein at least a portion of at least one of the interior surface or the exterior surface is scalloped proximate the root region of a chevron. Other embodiments may be described.

18 Claims, 7 Drawing Sheets

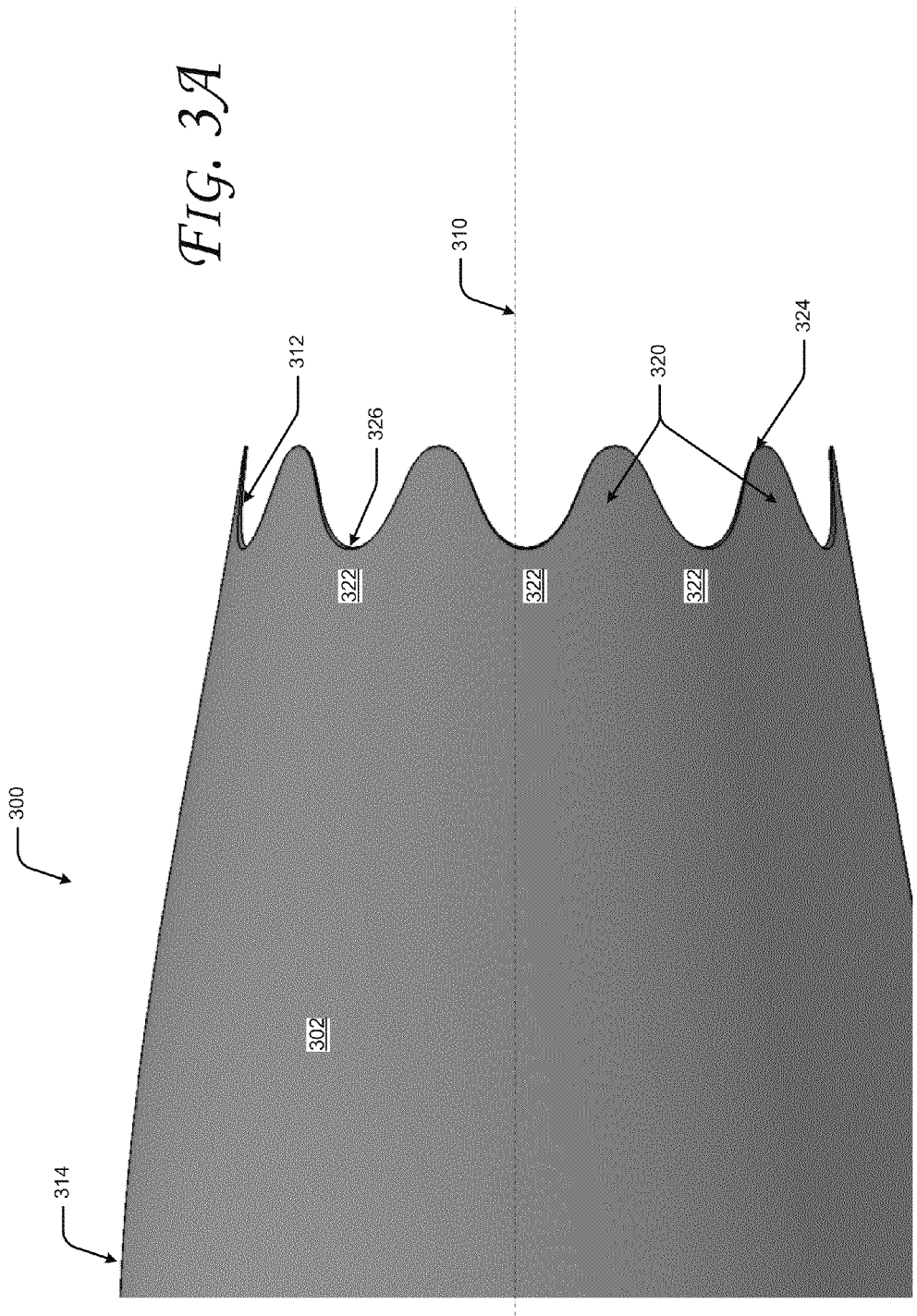

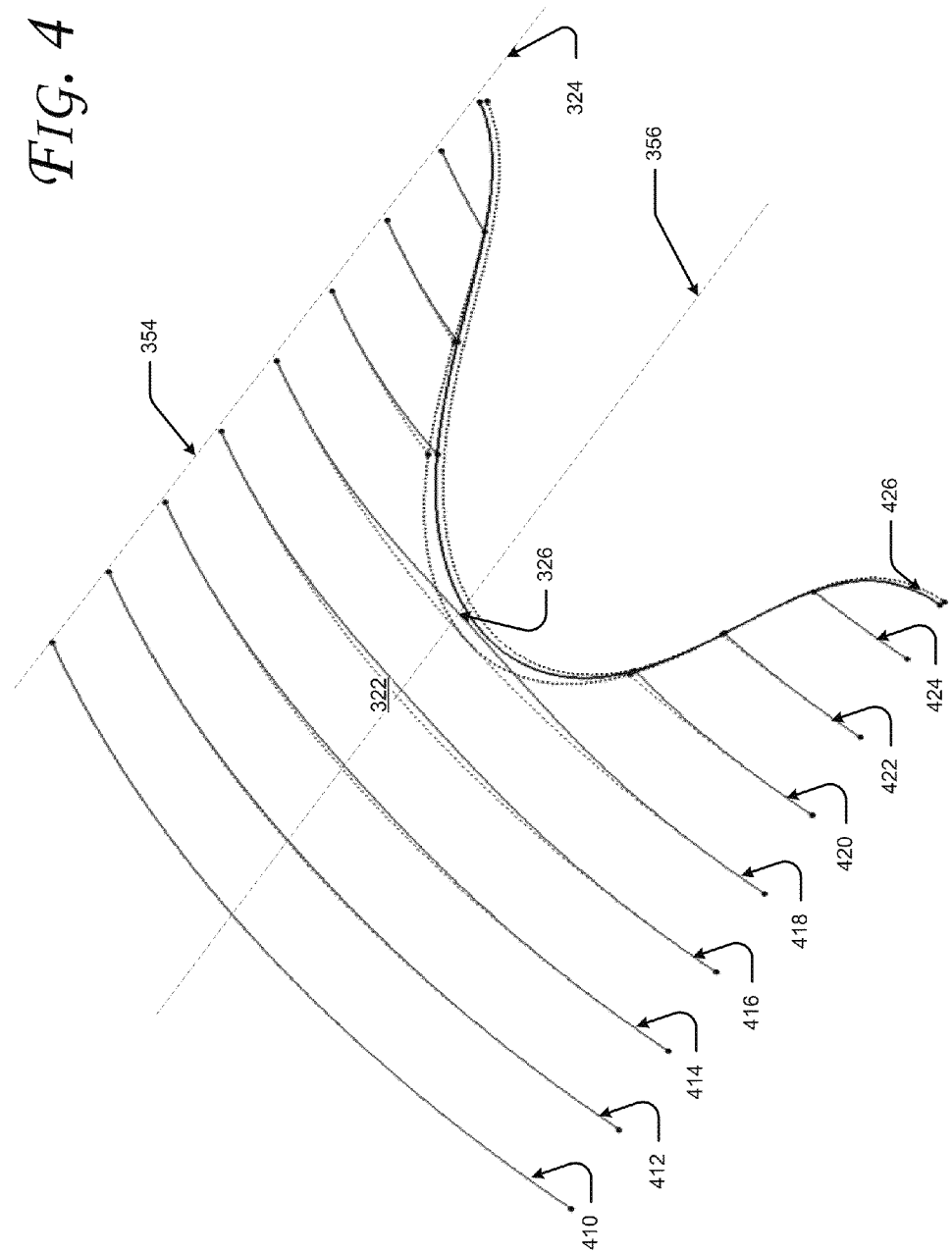

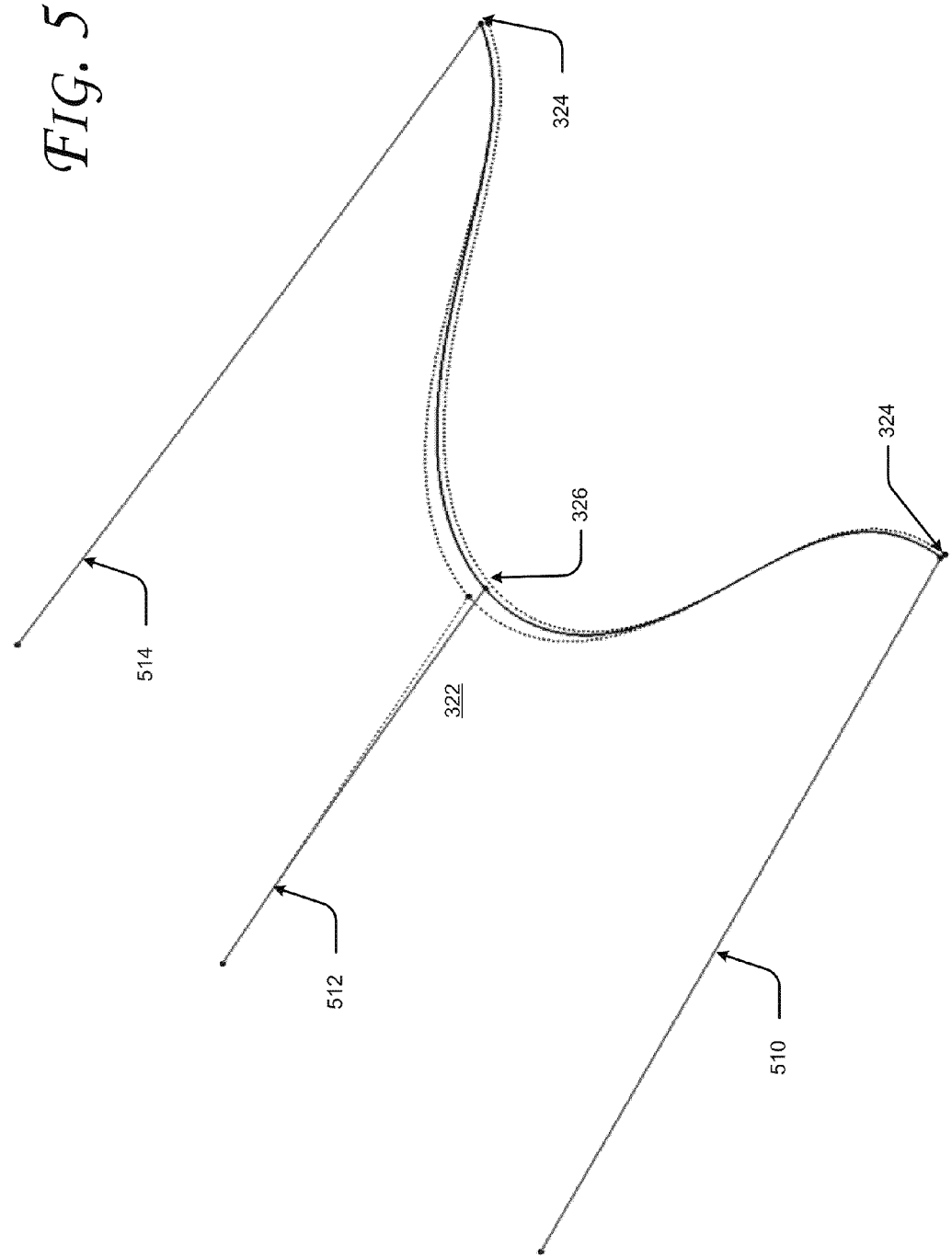

GAS TURBINE ENGINE NOZZLE CONFIGURATIONS

RELATED APPLICATIONS

None

FIELD OF THE DISCLOSURE

The subject matter described herein relates to gas turbine engines, and more particularly to nozzle configurations for gas turbine engines.

BACKGROUND

Aircraft engines have been made quieter as a result of advanced high bypass ratio engines. High bypass ratio engines derive a substantial fraction of their total thrust from bypass air which is propelled around the core of the engine by an engine-driven forwardly mounted fan. This approach results in less engine noise than pure turbojet engines or low bypass ratio engines.

One approach to further reducing engine noise is to increase the amount of mixing between the high velocity gases exiting the engine, and the surrounding freestream air. In that regard, the use of geometric structures known as chevrons may reduce low-frequency noise by increasing the rate at which the engine flow streams mix with the surrounding freestream air in the aft region of the nozzle. However, in some circumstances existing chevron designs may increase the drag of the duct, thereby decreasing engine efficiency. Accordingly, additional chevron designs may find utility.

SUMMARY

In various aspects, gas turbine nozzle configurations are provided. In some embodiments, gas turbine nozzle configurations as described herein include features to reduce drag associated with the nozzle or to tailor airflow through the nozzle.

Thus, in one aspect there is provided a gas turbine engine exhaust nozzle. In one embodiment, the gas turbine engine exhaust nozzle comprises a housing having a length which extends along a central longitudinal axis and comprising an interior surface and an exterior surface and a row of chevrons extending from an aft end of the housing, the chevrons having a root region and a tip. At least a portion of at least one of the interior surface or the exterior surface is scalloped proximate the root region of a chevron.

In another aspect there is provided a gas turbine engine assembly. In one embodiment, the assembly comprises an engine assembly disposed about a longitudinal axis, a first housing surrounding portions of the engine assembly and having a length which extends along the longitudinal axis, an interior surface and an exterior surface, and defining a core flow aperture at an aft end of the housing, a second housing surrounding portions of the first housing and having a length which extends along the longitudinal axis, an interior surface and an exterior surface, the exterior surface of the first housing and the interior surface of the second housing defining a fan flow aperture at an aft end of the second housing. In one embodiment at least one of the first housing or the second housing comprises a row of chevrons extending from an aft end of the housing, the chevrons having a root region and a tip, and at least a portion of at least one of the interior surface or the exterior surface is scalloped proximate the root region of a chevron.

In another aspect, there is provided a method of operating an aircraft engine assembly. In one embodiment, the method comprises generating a flow of exhaust gas in an aircraft engine, and directing the flow of exhaust gas through an exhaust nozzle exit aperture of a first housing surrounding at least a portion of the aircraft engine. In one embodiment the aperture has a perimeter with a row of chevrons extending from an aft end of the housing, the chevrons have a root region and a tip, and at least a portion of at least one of the interior surface or the exterior surface is scalloped proximate the root region of a chevron.

In another aspect, there is provided an aircraft. In one embodiment, the aircraft comprises a fuselage, wings, and a gas turbine engine assembly. The engine assembly, in turn, comprises an engine assembly disposed about a longitudinal axis, a first housing surrounding portions of the engine assembly and having a length which extends along the longitudinal axis, an interior surface and an exterior surface, and defining a core flow aperture at an aft end of the housing, a second housing surrounding portions of the first housing and having a length which extends along the longitudinal axis, an interior surface and an exterior surface, the exterior surface of the first housing and the interior surface of the second housing defining a fan flow aperture at an aft end of the second housing. In one embodiment at least one of the first housing or the second housing comprises a row of chevrons extending from an aft end of the housing, the chevrons having a root region and a tip, and at least a portion of at least one of the interior surface or the exterior surface is scalloped proximate the root region of a chevron.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

FIG. 3A is a schematic, perspective view of a gas turbine engine nozzle configured according to embodiments.

FIG. 4 is a schematic, perspective line view of a scalloped gas turbine engine chevron nozzle surface, according to embodiments.

FIG. 5 is a schematic, perspective line view of a scalloped gas turbine engine chevron nozzle surface, according to embodiments.

DETAILED DESCRIPTION

Described herein are exemplary gas turbine engine nozzle configurations and methods to operate gas turbine engines, and aircraft incorporating such nozzles. In some embodiments, a gas turbine engine exhaust nozzle comprises a housing having a row of chevrons extending from an aft end of the housing. The chevrons may be generally triangular in shape having a tip and defining a root region proximate the base of adjacent chevrons. As described herein, portions of at least one of the interior surface or the exterior surface of the housing are removed proximate the root regions of the chevrons to define regions referred to herein as "scalloped" root regions. Some or all of the root regions may be scalloped. In some embodiments, introducing scalloped root regions into an exhaust nozzle may reduce the drag coefficient of the nozzle, which in turn may increase the efficiency of the engine. Alternatively, or in addition, scalloped regions may tailor airflow through the engine.

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
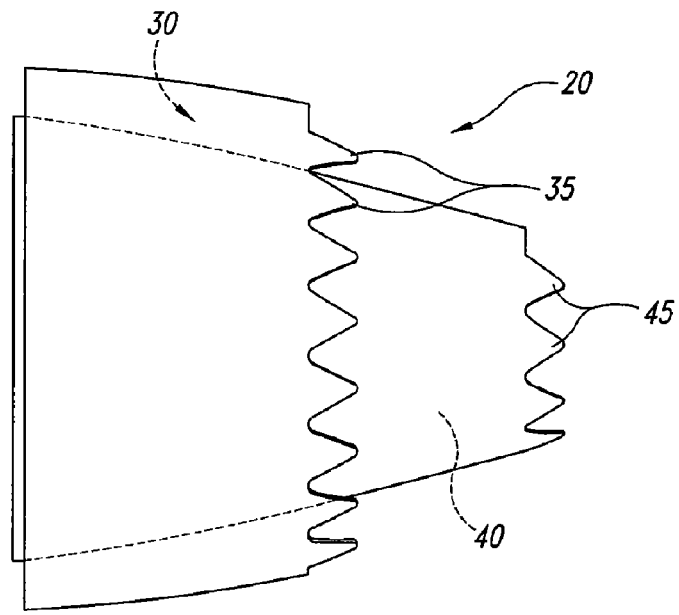
FIG. 1 is a schematic illustration of a gas turbine engine nozzle, according to embodiments.

FIG. 1 is a schematic illustration of an exemplary jet engine nozzle, according to embodiments. Referring to FIG. 1, a nozzle 20 has chevrons extending from an aft section of the nozzle 20. Chevrons generally include certain types of serrations on the nozzle lip, typically, triangular in shape having some curvature in the lengthwise cross-section, which slightly immerses them in the adjacent flow. A chevron can project either inwardly or outwardly, by an amount that is on the order of the upstream boundary layer thickness on the inner or outer surface, respectively. In general, the chevron planform shape can also be trapezoidal or rectangular. The nozzle 20 includes a core flow duct 40 through which the engine core flow is directed, and a fan flow duct 30 arranged annularly around the core flow duct 40, through which the fan air passes. The exit aperture of the fan flow duct 30 can include fan flow chevrons 35, and the exit aperture of the core flow duct 40 can include core flow chevrons 45.

Figure 2:
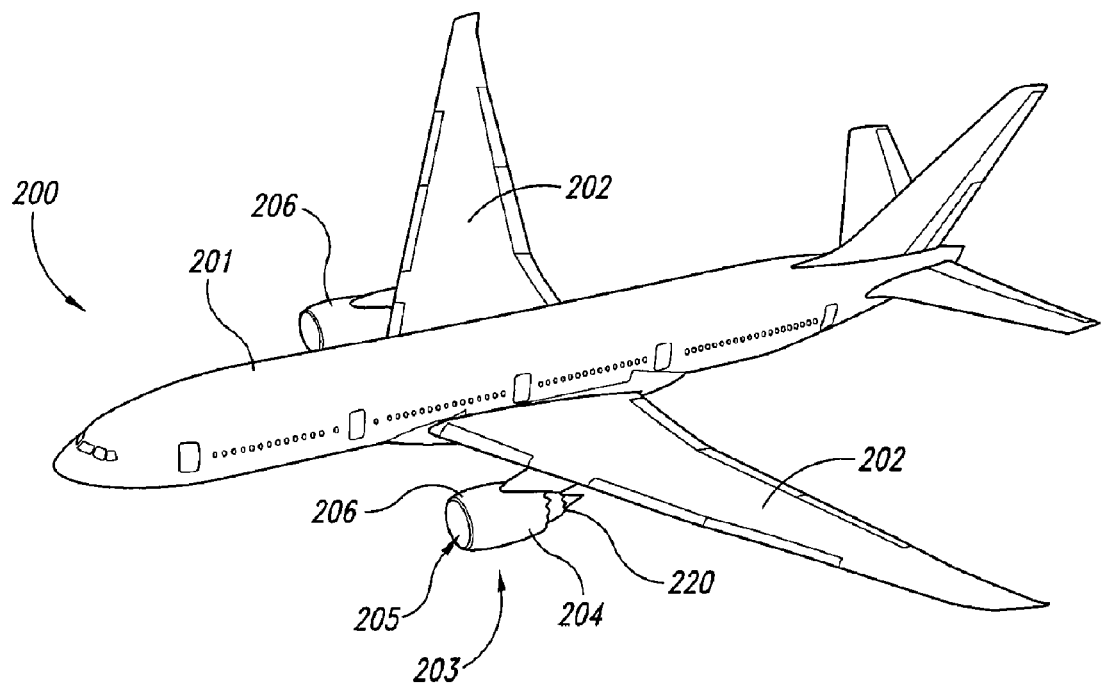
FIG. 2 is a schematic illustration of an aircraft having a gas turbine engine nozzle configured according to embodiments.

FIG. 2 is a schematic illustration of an aircraft 200 having a nozzle configured according to embodiments. Referring to FIG. 2, a commercial jet transport aircraft 200 comprises wings 202, a fuselage 201, and a propulsion system 203. The illustrated propulsion system 203 comprises at least one gas turbine engine, which may be implemented as a turbofan engine 206 carried by the wings 202. Each engine 206 is housed in a nacelle 204, which includes an inlet 205 and a nozzle 220. The nozzles 220 include chevrons having features, discussed in greater detail below, to reduce the coefficient of drag associated with the nozzle. In other embodiments, the aircraft 200 can include a different number of engines and/or engines carried by different portions of the aircraft, along with nozzles 220 that are tailored to the particular installation.

Figure 3B:
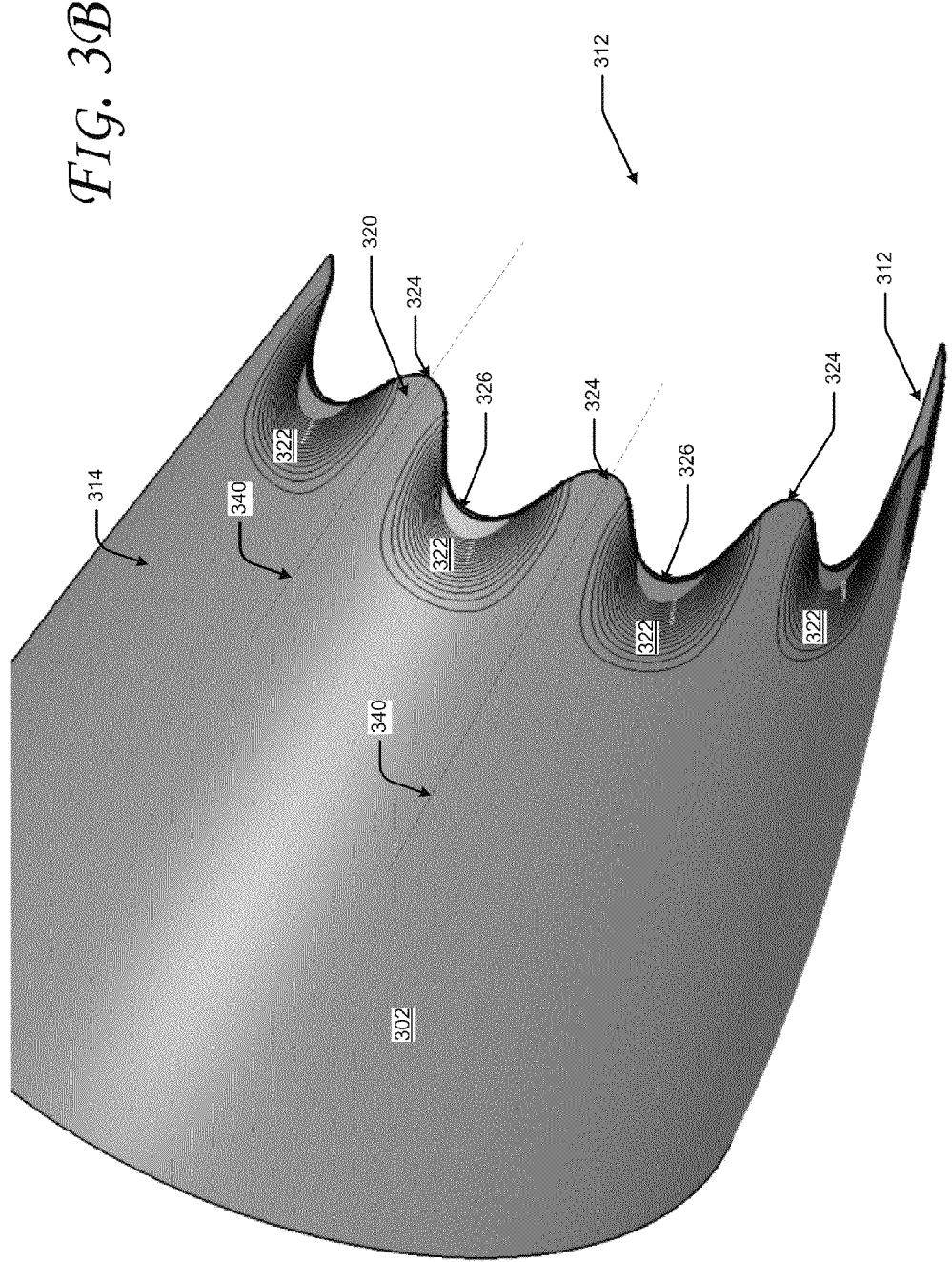
FIG. 3B is a schematic, perspective view of a scalloped chevron gas turbine engine nozzle surface, according to embodiments.
Figure 3C:
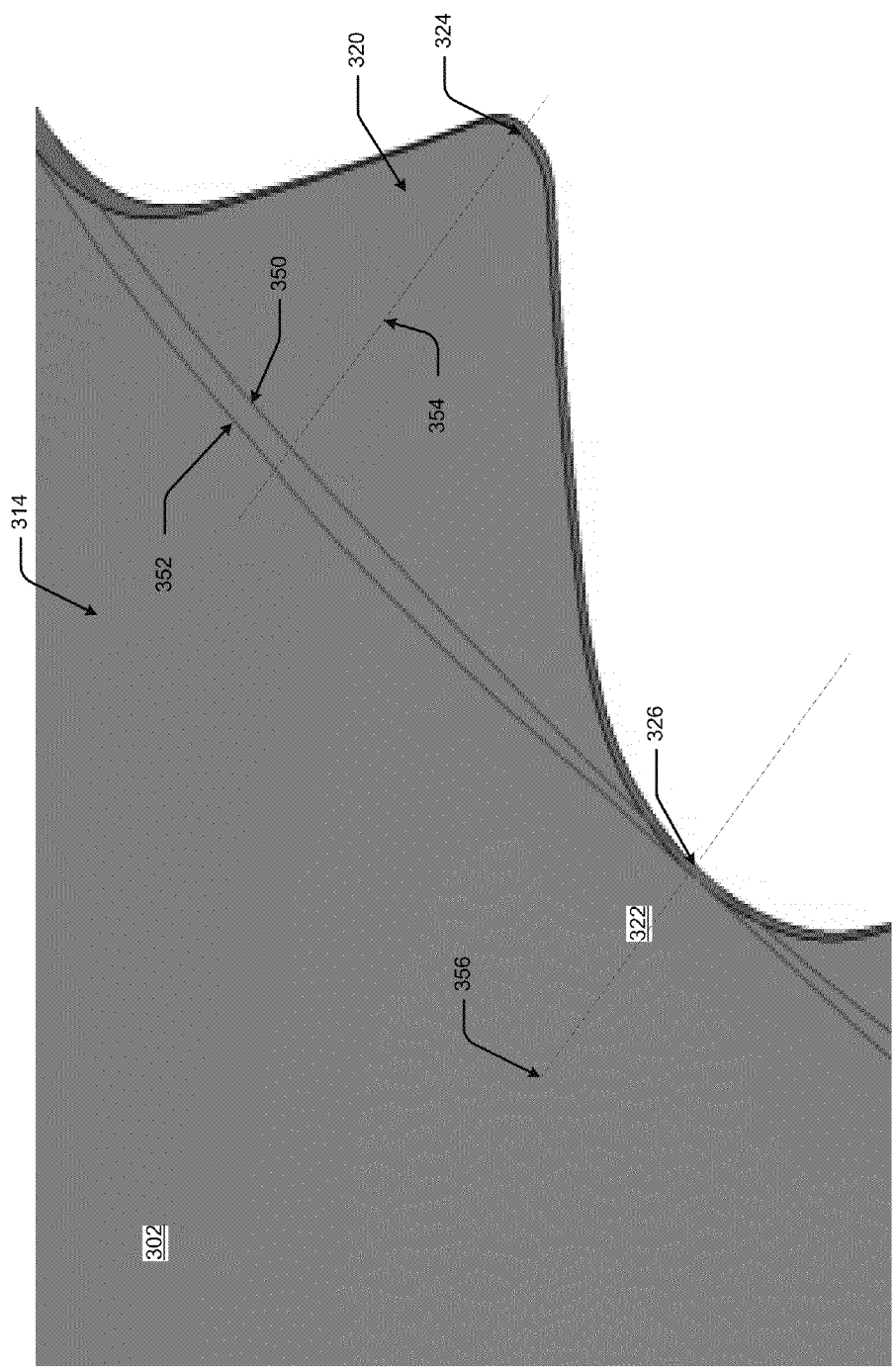
FIG. 3C is a schematic, perspective, close-up view of a section of a scalloped gas turbine engine chevron nozzle, according to embodiments.

FIGS. 3A-3C offer various views of a gas turbine engine nozzle configured according to embodiments. FIG. 3A is a schematic, perspective view of a jet engine nozzle configured according to embodiments. Referring first to FIG. 3A, in some embodiments a gas turbine engine exhaust nozzle 300 comprises a housing 302 having a length which extends along a central longitudinal axis 310 and comprising an interior surface 312 and an exterior surface 314.

A row of chevrons 320 extends from an aft end of the housing 302. The chevrons 320 may be generally triangular or sinusoidal in shape and have tip 324 and a base 326. Further, the chevrons 324 define a root region 322 proximate the base of adjacent triangles. As used herein, the phrase "root region" refers generally to portions of the surface area of the chevron displaced from tip of the chevrons.

In some embodiments the row of chevrons 320 encompasses the complete annulus of the aft end of the housing 302, while in other embodiments the row of chevrons may encompass only a portion of the annulus of the housing 302. Further, in the embodiment depicted in FIG. 3A, the various chevrons 320 are substantially uniform in size and shape, while in other embodiments the various chevrons 320 may vary in size and shape, e.g., to reduce noise in selected directions.

As illustrated in FIG. 3A, the surface of the annular housing 302 converges toward the longitudinal axis 310 proximate the aft end of the housing 302, such that the diameter of the housing decreases progressively toward the aft end of the housing 302. In some embodiments, the row of chevrons 320 essentially follows the contoured surface of the housing 302 such that each of the chevrons 320 lies in a plane that intersects the longitudinal axis 310.

In some embodiments, at least a portion of at least one of the interior surface or the exterior surface is scalloped proximate the root region 322 of a chevron 320. This is illustrated in FIG. 3B, which is a schematic, perspective view of a scalloped chevron nozzle surface, according to embodiments. Referring to FIG. 3B, portions of the root regions 322 are removed to define a scalloped surface area in the root regions 322. The scalloped root regions 322 in FIG. 3B are depicted by contoured lines analogous to topographical lines on a map. The scalloped root regions are generally laterally displaced from an axis 340 extending longitudinally along the surface 302 of the nozzle 300 and through the tip 324 of adjacent chevrons 320, and extend from the base 326 of the chevron. In some embodiments, the chevrons measure between 10 centimeters and 60 centimeters from the base to the tip, and the scalloped root regions 322 measure between approximately 5 and 75 centimeters in width and 5 and 90 centimeters in length. Of course, one skilled in the art will recognize that the specific measurements may vary both as a function of the engine size and as a function of engine load.

As a result of the scalloped root regions 322, the thickness of the annular housing varies in a cross-sectional plane drawn through the root regions 322 of the housing 302. This is illustrated in FIG. 3C, which is a schematic, perspective, close-up view of a section of a scalloped chevron nozzle, according to embodiments. Referring to FIG. 3C, the thickness of the housing 302 is depicted by contour lines 350 and 352, which follow the interior surface 312 of housing 302 and the exterior surface 314 of housing 302, respectively. The thickness of the housing 302 varies between a maximum thickness at a point along a longitudinal axis 354 extending through the tip 324 of the chevron 320 to a minimum at a point along a longitudinal axis 356 extending through the base 326 of the chevron. In some embodiments, the thickness of the housing varies between a maximum thickness of 2.5 centimeters and a minimum thickness of 0.25 centimeters. Of course, ones skilled in the art will understand that the thickness of the housing varies both as a function of the engine size and as a function of engine load.

Differences between the surface contours of a conventional, constant-thickness housing and a contoured housing that implements scalloped root regions are illustrated in FIGS. 4 and 5. FIG. 4 is a schematic, perspective line view of a scalloped chevron nozzle surface, according to embodiments. In FIG. 4 the scalloped surface is indicated by solid contour lines and the conventional surface is indicated by dashed lines. The scalloped root region is indicated generally by reference numeral 322. The contour lines 410, 412, 414, 416, 418, 420, 422, and 424 represent lateral cross-section contour lines at various positions along the longitudinal axis 356 of the housing 302.

The first contour line 410 represents a lateral cross-section taken outside the scalloped root region 322. In this region the contour lines are coextensive. However, the contour lines diverge as they approach the base 326 of the chevron. Thus, the surfaces begin to diverge when the contour line 412 crosses the scalloped region 322. Successive contour lines 414, 416, 418, show increasing greater divergence between the surface contours. The divergence is at a maximum along the longitudinal axis 356 that extends through the base 326 of the chevron and the contour lines converge at a point along a longitudinal axis 354 extending through the tip 324 of the chevron.

FIG. 5 is a schematic, perspective line view of a scalloped chevron nozzle surface, according to embodiments. In FIG. 5 the scalloped surface is indicated by solid contour lines and the conventional surface is indicated by dashed lines. The scalloped root region is indicated generally by reference numeral 322. The contour lines 510, 512, 514 are taken in a longitudinal direction, rather than a lateral direction. Thus, the contour lines 510, 514, taken along a longitudinal axis through the peak 324 of a chevron are substantially coextensive, indicating that the surfaces are of substantially equal thicknesses along those axes. By contrast, the contour lines 512, taken along a longitudinal axis through the base 326 of a chevron diverge as the lines approach the base 326, illustrating the contoured surface of a scalloped chevron root region 322.

Figure 6:
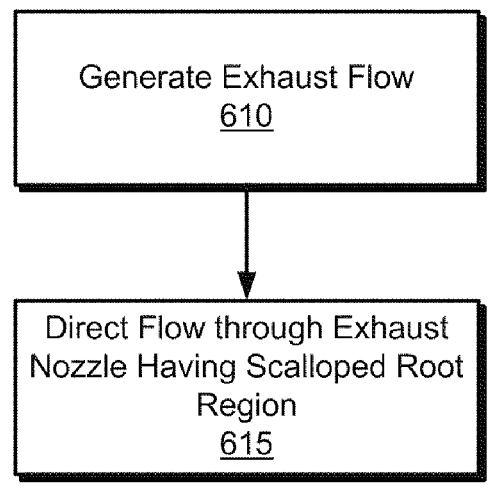
FIG. 6 is a flowchart illustrating operations in a method to operate an aircraft engine assembly, according to embodiments.

FIG. 6 is a flowchart illustrating operations in a method to operate an aircraft engine assembly, according to embodiments. Referring to FIG. 6, at operation 610 an exhaust flow is generated. In some embodiments, operation 610 may be implemented by a gas turbine engine such as, e.g., a jet engine. At operation 615 the exhaust flow is directed through an exhaust nozzle have at least one scalloped root region, such as the nozzles described herein.

Thus, as described herein a gas turbine engine nozzle may be provided with chevrons having scalloped root regions. The root regions may be scalloped on at least one of the interior surface, the exterior surface, or both. In some embodiments, a scalloped root region may decrease the drag coefficient of the nozzle, thereby enhancing the efficiency of the engine. In another embodiment, a scalloped root region may modulate exhaust flow and or may improve the fuel efficiency of the engine and exhaust system.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A gas turbine engine exhaust nozzle, comprising:
a housing having a length which extends along a central longitudinal axis and comprising an interior surface and an exterior surface wherein the housing has a thickness that is substantially constant in cross-sectional stations forward of an aft end of the housing; and
a row of chevrons extending from the aft end of the housing, the chevrons having a root region and a tip,
wherein at least a portion of at least one of the interior surface or the exterior surface is scalloped proximate the root region of a chevron forming a scallop shaped region of reduced thickness relative to the rest of the chevron, and
wherein the housing has a thickness that varies in cross-sectional stations proximate the root regions of the chevrons between a maximum thickness at a point along a longitudinal axis extending through the tip of each chevron to a minimum at a point along a longitudinal axis extending through the base of the chevron.

2. The gas turbine engine exhaust nozzle of claim 1, wherein:
the housing comprises a contoured surface which converges toward the central longitudinal axis proximate the aft end of the housing; and
the row of chevrons follows the contoured surface such that the tip of the chevrons lie in a plane that intersects the central longitudinal axis.

3. The gas turbine engine exhaust nozzle of claim 1, wherein the chevrons measure between 10 centimeters and 60 centimeters from the base to the tip and the scalloped root regions measure between 5 and 75 centimeters in width and between 5 and 90 centimeters in length.

4. The gas turbine engine exhaust nozzle of claim 3, wherein the thickness of the housing varies between a maximum thickness of 2.5 centimeters and a minimum thickness of 0.25 centimeters.

5. The gas turbine engine exhaust nozzle of claim 4, wherein:
the row of chevrons extend about the entire aft end of the housing; and
the chevrons are substantially uniform in size and shape.

6. The gas turbine engine exhaust nozzle of claim 4, wherein:
the row of chevrons extend about the entire aft end of the housing; and
the chevrons vary in size and shape.

7. A gas turbine engine assembly, comprising:
an engine assembly disposed about a longitudinal axis;
a first housing surrounding portions of the engine assembly and having a length which extends along the longitudinal axis, an interior surface and an exterior surface, and defining a core flow aperture at an aft end of the housing, and a thickness that is substantially constant in cross-sectional stations forward of an aft end of the housing;
a second housing surrounding portions of the first housing and having a length which extends along the longitudinal axis, an interior surface and an exterior surface, the exterior surface of the first housing and the interior surface of the second housing defining a fan flow aperture at an aft end of the second housing, and a thickness that is substantially constant in cross-sectional stations forward of an aft end of the housing, and
wherein at least one of the first housing or the second housing comprises:
a row of chevrons extending from an aft end of the housing, the chevrons having a root region and a tip, and
wherein at least a portion of at least one of the interior surface or the exterior surface is scalloped proximate the root region of a chevron forming a scallop shaped region of reduced thickness relative to the rest of the chevron, and the housing has a thickness that varies in cross-sectional stations proximate the root regions of the chevrons between a maximum thickness at a point along a longitudinal axis extending through the tip of each chevron to a minimum at a point along a longitudinal axis extending through the base of the chevron.

8. The gas turbine engine assembly of claim 7, wherein:
at least one of the first housing or the second housing comprises a contoured surface which converges toward the central longitudinal axis proximate the aft end of the housing; and
the row of chevrons follows the contoured surface such that the tip of the chevrons point toward the central longitudinal axis.

9. The gas turbine engine assembly of claim 7, wherein:
the chevrons measure between 10 centimeters and 60 centimeters from the base to the tip and the scalloped root regions measure between 5 and 75 centimeters in width and between 5 and 90 centimeters in length.

10. The gas turbine engine assembly of claim 7, wherein:
the thickness of the housing varies between a maximum thickness of 2.5 centimeters and a minimum thickness of 0.25 centimeters.

11. The gas turbine engine assembly of claim 10, wherein:
the row of chevrons extends about the entire end of the housing; and
the chevrons are substantially uniform in size and shape.

12. The gas turbine engine assembly of claim 10, wherein:
the row of chevrons extends about the entire end of the housing; and
the chevrons vary in size and shape.

13. An aircraft, comprising:
a fuselage;
wings; and
a gas turbine engine assembly, comprising:
an engine assembly disposed about a longitudinal axis;
a first housing surrounding portions of the engine assembly and having a length which extends along the longitudinal axis, an interior surface and an exterior surface, and defining a core flow aperture at an aft end of the housing and a thickness that is substantially constant in cross-sectional stations forward of an aft end of the housing;
a second housing surrounding portions of the first housing and having a length which extends along the longitudinal axis, an interior surface and an exterior surface, the exterior surface of the first housing and the interior surface of the second housing defining a fan flow aperture at an aft end of the second housing and a thickness that is substantially constant in cross-sectional stations forward of an aft end of the housing,
wherein at least one of the first housing or the second housing comprises:
a row of chevrons extending from an aft end of the housing, the chevrons having a root region and a tip, and
wherein at least a portion of at least one of the interior surface or the exterior surface is scalloped proximate the root region of a chevron forming a scallop shaped region of reduced thickness relative to the rest of the chevron, and the housing has a thickness that varies in cross-sectional stations proximate the root regions of the chevrons between a maximum thickness at a point along a longitudinal axis extending through the tip of each chevron to a minimum at a point along a longitudinal axis extending through the base of the chevron.

14. The aircraft of claim 13, wherein:
at least one of the first housing or the second housing comprises a contoured surface which converges toward the central longitudinal axis proximate the aft end of the housing; and
the row of chevrons follows the contoured surface such that the tips of the chevrons lie in a plane that intersects the central longitudinal axis.

15. The aircraft of claim 13, wherein:
the chevrons measure between 10 centimeters and 60 centimeters from the base to the tip and the scalloped root regions measure between 5 and 75 centimeters in width and between 5 and 90 centimeters in length.

16. The aircraft of claim 13, wherein:
the thickness of the housing varies between a maximum thickness of 2.5 centimeters and a minimum thickness of 0.25 centimeters.

17. The aircraft of claim 16, wherein:
the row of chevrons extends about the entire end of the housing; and
the chevrons are substantially uniform in size and shape.

18. The gas turbine engine assembly of claim 16, wherein:
the row of chevrons extends about the entire end of the housing; and
the chevrons vary in size and shape.

* * * * *